July 27, 1948.  P. J. WALSH  2,445,897
ALTERNATING CURRENT SYSTEM
Filed April 29, 1946

INVENTOR.
Philip J. Walsh.

Patented July 27, 1948

2,445,897

UNITED STATES PATENT OFFICE 2,445,897

ALTERNATING CURRENT SYSTEM

Philip J. Walsh, San Francisco, Calif.

Application April 29, 1946, Serial No. 665,655

7 Claims. (Cl. 171—97)

This invention relates to a system for converting direct current into alternating current.

It is one of the objects of my invention to provide an efficient low cost method for converting direct current into alternating current in a system having no moving parts.

It is another object of my invention to provide a system for converting very low voltage direct current into alternating current at any frequency or voltage.

It is another object of my invention to provide an oscillation generator requiring no electron discharge devices.

It is still another object of my invention to provide an alternating current power multiplier.

My invention possesses many other advantages and has other objects which may be made more easily apparent from a consideration of several embodiments of my invention. For this purpose, I have shown a few forms in the drawings accompanying and forming part of the present specification. I shall now proceed to describe these forms in detail, which illustrate the general principles of my invention; but it is to be understood that this detailed description is not to be taken in a limiting sense, since the scope of my invention is best defined by the appended claims.

Referring to the drawings.

Figure 1:
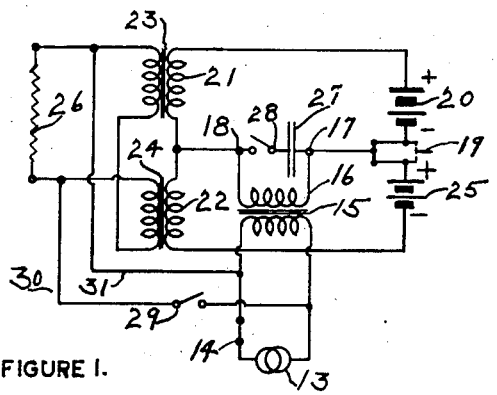
Figure 1 is a system diagram depicting one form of my invention.
Figure 2:
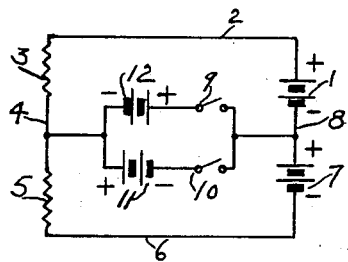
Figure 2 is a drawing for facilitating explanation of the invention.

The operation of the system shown in Figure 1 can best be understood by first considering some of the fundamental principles as set forth in Figure 2.

Referring to Figure 2, it is seen that current can flow through the circuit comprising battery 1, conductor 2, resistor 3, connection 4, resistor 5, conductor 6, battery 7, conductor 8 and battery 1. With the switches 9 and 10 open as shown in the drawing, the equal series connected batteries 1 and 7 produce equal current flow through the equal series connected resistors 3 and 5. When the switch 10 is closed, the value of the current flowing through the resistor 5 is doubled while the value of the current flowing through the resistor 3 is simultaneously reduced to zero. This comes about because the batteries 11 and 7 are in series assisting relation across resistor 5, but the batteries 11 and 1 are connected in series opposed relation across resistor 3. If the electromotive force developed by battery 11 is made slightly greater than the electromotive force developed by battery 1, closing switch 10 not only stops the flow of current through resistor 3 but causes the battery 11 to send a small reverse current through the circuit comprising battery 11, resistor 3, conductor 2, battery 1, conductor 8, and switch 10 to battery 11. If the switch 10 is left open and the switch 9 closed, the actions are reversed, that is, the value of the current flowing through the resistor 3 is doubled while all current flow through the resistor 5 is simultaneously stopped.

In Figure 2, I show a source of alternating current 13 connected through a switch 14 to the primary coil of a transformer 15 having the secondary coil 16 connected to the terminals 17 and 18. If the switch 14 is left open and the switch 19 closed, direct current from the two batteries in series flows from the positive terminal of battery 20 through the primary coils 21 and 22 of the transformers 23 and 24 respectively, and back to the negative terminal of battery 25. Since the electromotive force of battery 20 equals that of battery 25 and the coils 21 and 22 are equal, no direct current difference of potential exists across the terminals 17 and 18, and therefore, no direct current flows through the coil 16.

Now let us assume that the switch 14 is closed thus applying alternating current potential to the transformer 15 making, at this instant, the terminal 18 positive and the terminal 17 negative. Under these conditions the electromotive force developed by the coil 16 is in series assisting relation with the electromotive force developed by the battery 25 and is in series opposed relation to the electromotive force developed by the battery 20. Therefore, the value of the current flowing through the coil 22 gradually increases as the value of the current flowing through the coil 21 decreases. The decrease in the flux in the core of the transformer 23 causes an electromotive force of one direction to be induced in the secondary coil while the increase in the flux in the core of transformer 24 causes an electromotive force in the opposite direction to be induced in the other secondary coil. By connecting the secondary coils as shown these forces are combined and applied to the single load 26.

During the remainder of the cycle when the terminal 17 is positive and the terminal 18 negative, the electromotive force developed by the coil 16 is in series assisting relation with the electromotive force developed by the battery 20 and is in series opposed relation to the electromotive force developed by the battery 25. By making the peak or maximum electromotive force developed in coil 16 substantially equal to the electromotive force across one of the batteries, such as 20, no reverse current can flow through the batteries.

Since the coil 16 operates in series with the battery 25 during one half of the cycle and in series with the battery 20 during the other half of the cycle it is seen that substantially one half of the alternating current power dissipated in the load 26 comes from the source 13, the rest being supplied by the batteries 20 and 25. Therefore, the system is an alternating current power multiplier.

Since the alternating current power output is greater than the alternating current power input it is obvious that some of the power can be fed back from the output to the input to sustain continuous oscillations with the source 13 disconnected from the system.

This is preferably done by making the reactance of the condenser 27 equal to the reactance of one of the coils, such as 22, at the frequency of the source 13. With the switch 28 closed, the condenser cooperates with the coils 21 and 22 to form a parallel resonant circuit across the terminals 17 and 18. That is, the batteries 20 and 25 operate to prevent the flow of reverse current so that the condenser 27 and coil 22 cooperate to form a parallel resonant circuit during one half of the cycle while the condenser 27 and coil 21 cooperate to form a parallel resonant circuit during the other half of the cycle.

Under these conditions, if the load is small, or disconnected, the value of the alternating current flowing from the coil 16 into the parallel resonant circuit is very small. Since the alternating current voltage across the load 26 is equal to the voltage across the source 13, the switch 29 can be closed and the switch 14 opened, these switches being arranged mechanically for simultaneous operation. Feed back current can now flow over the wires 30 and 31 into the transformer 15 to supply a small current to the parallel resonant circuit across the terminals 17 and 18 which acts to trigger-off energy from the batteries 20 and 25 to maintain the continuous generation of alternating current through the load 26 with the source 13 disconnected from the system.

It is to be noted that the parallel resonant circuit has a fly-wheel effect and that a very much larger current surges between the condenser 27 and the coils 21 and 22 than is fed in at the terminals 17 and 18 by the secondary coil 16. When the condenser 27 discharges from terminal 18 through the coil 22 it does so in series with the battery 25 and when it discharges from terminal 17 through the coil 21 it does so in series with the battery 20. That is, the condenser current is always in the direction of the battery voltage.

Figure 3:
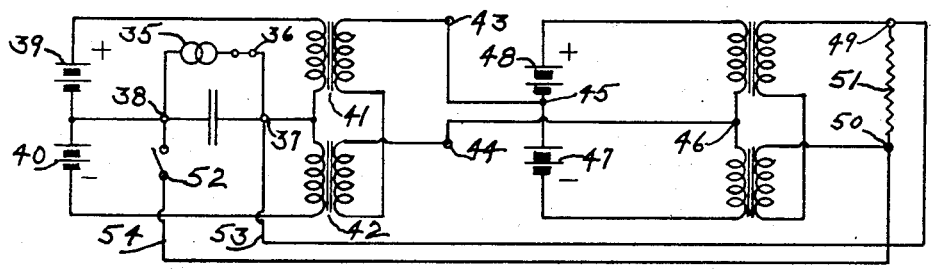
Figure 3 is a system diagram showing a further modification.

In Figure 3 I show a two stage system that operates either as an alternating current power multiplier or as a converter. The alternating current source 35 is connected through the switch 36 to the terminals 37 and 38 and supplies alternating current power to the system. The batteries 39 and 40 correspond to the batteries 20 and 25 of Figure 1 and this part of the system together with the transformers 41 and 42 operates in the same manner as the system shown in Figure 1 to produce twice as much alternating current power at the terminals 43 and 44 as is fed in at the terminals 37 and 38. This alternating current power is fed into the next stage at the terminals 45 and 46 and combines with the direct current power from the batteries 47 and 48 to produce twice as much alternating current power at the terminals 49 and 50 as is fed in at the terminals 45 and 46. Any number of stages can be arranged in this manner to form a multistage power multiplier to produce a large power output in a load such as 51.

By connecting a feed back circuit from the terminals 49 and 50 through the switch 52 to the terminals 37 and 38 some of the output can be fed back to the input to sustain the continuous generation of alternating current from the direct current power furnished by the batteries. The switches 36 and 52 being arranged mechanically so that when the switch 52 is closed the switch 36 snaps open thus allowing feed back current to flow over the wires 53 and 54 from terminals 49 and 50 to terminals 37 and 38.

Figure 4:
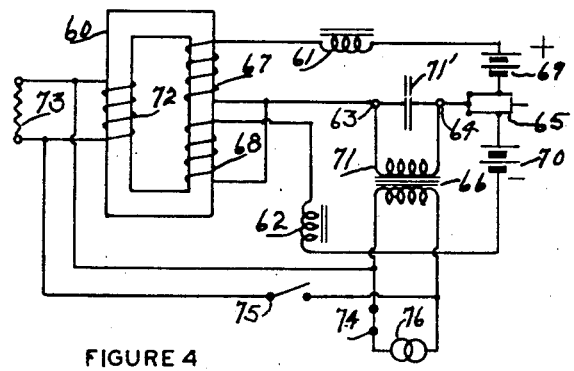
Figure 4 is a system diagram showing a still further modification.

In Figure 4, I show a form of the invention using a single transformer 60, and two saturable core reactors 61 and 62 which, make it possible to operate with an alternating current input voltage that is higher than the battery voltage. Otherwise this form of the invention is similar to the form shown in Figure 1, the transformer 66 corresponds to the transformer 15, the coils 67 and 68 correspond to the coils 21 and 22, and the batteries 69 and 70 correspond to the batteries 20 and 25.

The actions are best explained by assuming that the switch 65 is closed when the terminal 63 is positive and the terminal 64 negative, the power being supplied by the alternating current source 76. Under these conditions, current flows from the secondary coil 71 through the coil 68, through the saturable core reactor 62 and through battery 70 to terminal 64. Simultaneously current flows from terminal 63 through coil 67, in the same direction as the current flowing through coil 68, thence through the saturable core reactor 61, and through battery 69 to terminal 64. The value of the current flowing through the coils 67 and 61 is very small since it is opposed by the voltage of battery 69 and the high impedance of coil 61. But the value of the current flowing through the coils 68 and 62 is relatively very large because it is assisted by the voltage of battery 70 and because the core of the coil 62 saturates early in the cycle so that the apparent impedance of coil 62 is very small. The current flowing through the coils 68 and 67 sets up magnetic flux in one direction in the core of transformer 60.

During the other half of the cycle of impressed alternating current, when the terminal 64 is positive and the terminal 63 negative, the actions are reversed and the coils 67 and 68 set up magnetic flux in the opposite direction in the core of transformer 60. Under these conditions, current flows from coil 71 through battery 69, coil 61, coil 67 and to terminal 63. A small current simultaneously flows from terminal 64, through battery 70, coil 62, coil 68 and to terminal 63 because the voltage of battery 70 is opposed to that of coil 71. Since the battery 69 assists the voltage of coil 71 the core of the coil 61 saturates and the large current now flows through the coil 67. The condenser 71' corresponds to the condenser 27 of Figure 1 and operates in the same manner to form a parallel resonant circuit across the terminals 63 and 64.

By transformer action an electromotive force is induced in the secondary coil 72 which supplies power to the load 73. The feed back circuit is similar to that shown in Figure 1, the switch 74 corresponds to the switch 14 and the switch 75 corresponds to the switch 29. By closing the switch 75 and opening the switch 74 the system continues to produce alternating current in the load 73 with the alternating current source 76 disconnected.

Sources of direct current power other than batteries can be employed, such as dynamos etc. And on the alternating current side, sources of alternating current power such as alternators, vacuum tube oscillators, or mechanical vibrator type circuit interrupters can be used depending upon the purpose to which the system is applied.

I claim:

1. The method of converting direct current energy into alternating current energy comprising applying a fluctuating voltage in opposite phase to each of a pair of direct current sources, and combining in series, the output of both direct current sources as modified by said flutcuating voltage.

2. The method of converting direct current energy into alternating current energy comprising simultaneously applying an alternating current voltage in opposite phase to each of a pair of direct current sources, combining in series, the output of both direct current sources as modified by said alternating current voltage.

3. In combination, a parallel resonant circuit having two branches and a common branch, a source of direct current in each of said two branches, and means including a source of alternating current potential coupled to said common branch to alternately oppose the flow of current from one of said direct current sources while increasing the flow of current through the other direct current source during each cycle, means combining these effects in an output circuit, and means feeding back some of the output power to said common branch to sustain continuous oscillations upon removal of said original source of alternating current potential.

4. In combination, a closed circuit comprising a pair of sources of direct current and a pair of windings, means connecting the same in series, a source of alternating current connected between a point intermediate said windings and a point intermediate said sources of direct current for simultaneously reducing the value of the current through one winding and increasing it through the other winding, and means for combining these effects in a work circuit wherein the output power is substantially the sum of the power from said alternating current and direct current sources.

5. In a system of the character described, a multi-stage power multiplier comprising a plurality of similar stages, each having means for applying a fluctuating voltage in opposite phase to each of a pair of series-connected direct current sources to produce alternating current output power, means for feeding the output power of one stage into the input of the next stage to be combined with more direct current power to produce a greater alternating current output power, and means comprising a load circuit coupled to the final stage.

6. In combination, a closed circuit comprising a pair of sources of direct current, a pair of load elements, means connecting said sources of direct current and said load elements in series, and a source of fluctuating current connected between a point intermediate said load elements and a point intermediate said sources of direct current.

7. In combination, a closed circuit comprising a pair of sources of direct current, a pair of windings, means connecting said sources of direct current and said windings in series, a source of alternating current connected between a point intermediate said windings and a point intermediate said sources of direct current, and means coupled to said windings to withdraw power from said closed circuit.

PHILIP J. WALSH.